April 26, 1966  C. A. DEHNE  3,247,806
POWER AND FREE CONVEYOR
Filed May 21, 1964  2 Sheets-Sheet 1
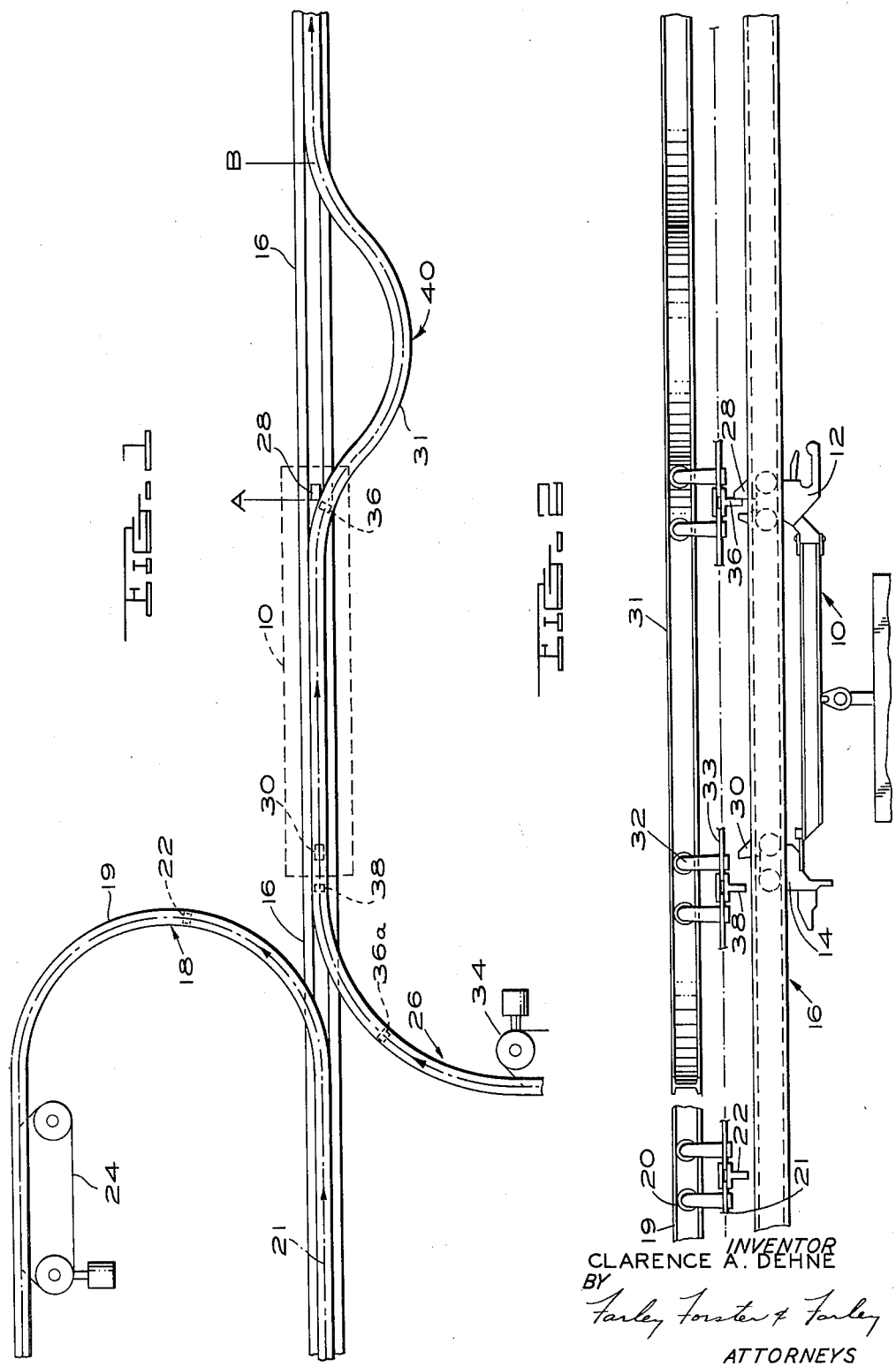
INVENTOR
CLARENCE A. DEHNE
BY
Farley Forster & Farley
ATTORNEYS

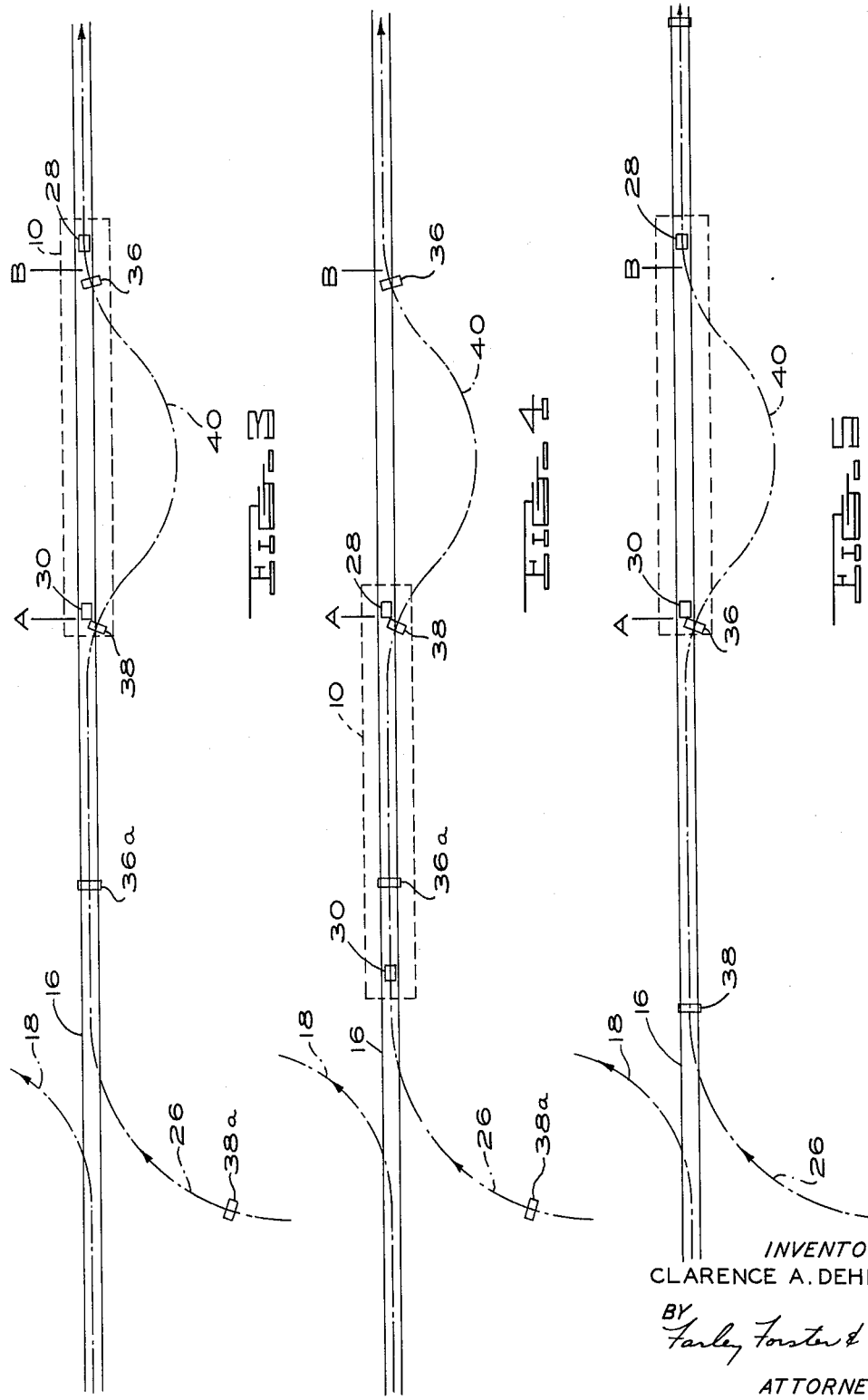

United States Patent Office 3,247,806
Patented Apr. 26, 1966

3,247,806
POWER AND FREE CONVEYOR
Clarence A. Dehne, Louisville, Ky., assignor to Jervis B. Webb Company, Detroit, Mich., a corporation of Michigan
Filed May 21, 1964, Ser. No. 369,231
4 Claims. (Cl. 104—172)

This invention relates to improvements in conveyors of the power and free type having a powerline, including a track supporting an endless propelling chain and pushers, and a load track supporting carriers each equipped with a driving dog engageable by one of the pushers.

In conveyors of this type it is frequently necessary to advance a carrier along a load track for engagement by a pusher of a receiving powerline, in which case it is also usually necessary to provide some suitable form of control devices to insure that the carrier is engaged by the right pusher in order that carriers will be properly spaced along the receiving powerline. The present invention provides a way of automatically accomplishing this result by a special track section where the load and receiving power tracks are arranged to provide a self-sorting action between the pushers and dogs of a carrier so that the carrier emerges from this special section being propelled by the right pusher regardless of which pusher initially engaged the carrier.

The power and free conveyor of the invention has a load track supporting a carrier equipped with a pair of longitudinally spaced leading and trailing driving dogs, a receiving power track supporting an endless propelling member having pairs of longitudinally spaced leading and trailing pushers mounted thereon with the spacing between each pair of pushers being slightly in excess of the spacing between the driving dogs of the carrier and with a different spacing between adjacent pairs of leading and trailing pushers; and a transfer zone at which the load and receiving power tracks converge to position a pusher of the receiving power track in driving relation with a dog of a carrier; and is characterized by the provision of a dog and pusher sorting section following the transfer zone for automatically placing the leading pusher of a pair of pushers in engagement with the leading dog of a carrier, this sorting section comprising a track section along which the load and receiving power tracks diverge and converge from a first position where a pusher and driving dog disengage to a second position where a pusher and driving dog can re-engage, the length of the load track between the first and second positions not exceeding the spacing between the leading and trailing driving dogs of a carrier, and the length of the receiving power track between the first and second positions being not less than the spacing between the leading and trailing pushers of the receiving powerline.

A carrier entering this sorting section will be advanced along the load track with almost continuous forward movement if the leading driving dog of a carrier has been properly engaged by the leading pusher of a pair of pushers; but, if some other relation between the carrier dogs and powerline pushers is present when the carrier enters the sorting section the desired relation is obtained when the carrier leaves the sorting section.

These and other features of the invention will become more apparent from the following description of the representative embodiment disclosed in the accompanying drawings wherein:

FIGURE 1 is a plan view showing a transfer zone between a forwarding powerline and receiving powerline of a power and free conveyor with the sorting section of the invention installed in the receiving powerline following the transfer zone:

FIGURE 2 is a side elevation of the structure shown in FIG. 1; and

FIGURES 3, 4 and 5 are each plan views similar to FIG. 1, but more schematic, illustrating various possible relations between the pushers of the receiving powerline and driving dogs of a carrier.

Referring to FIGS. 1 and 2, a carrier 10 includes a leading trolley 12 and a trailing trolley 14 which travel on a conventional double-channel load track 16. A forwarding powerline 18, including an I-beam track 19 and trolleys 20 supporting an endless chain 21 provided with pushers 22, is mounted above the left-hand portion of the load track 16 and is driven by a conventional drive unit 24. The forwarding powerline 18 diverges laterally from the path of the load track as shown in FIG. 1 at a transfer zone where a receiving powerline 26 converges into driving relation with a carrier supported on the load track, and the carrier is advanced from the forwarding to the receiving powerline by successive engagement of pushers 22 of the forwarding powerline with a driving dog 28 on the leading carrier trolley 12 and with a driving dog 30 on the trailing carrier trolley 14. Various ways in which this transfer may be accomplished are described in greater detail in my co-pending applications Serial Nos. 180,227 filed March 16, 1962, and 351,465 filed March 12, 1964.

The receiving powerline 26 includes a track 31 and trolleys 32 supporting an endless chain 33 powered by a drive unit 34, and the chain is equipped with pushers arranged in pairs, each pair of pushers consisting of a leading pusher 36 and a trailing pusher 38. As shown in FIGS. 1 and 2 the distance along the chain 33 between the leading pusher 36 and trailing pusher 38 of each pair of pushers is slightly in excess of the longitudinal spacing between the leading driving dog 28 and trailing driving dog 30 of a carrier. Each pair of leading and trailing pushers 36 and 38 are separated by a distance different than the spacing between the pushers of a pair in order to establish proper carrier spacing along the receiving powerline. This is illustrated by the distance between the trailing pusher 38 shown in FIG. 1 and the leading pusher 36a of the next pair.

Hence, as part of the transfer operation it is necessary that the carrier 10 be positioned relative to the receiving powerline so that the leading dog 28 of a carrier is engaged by the leading pusher 36 of a pair of pushers. Such a relationship between the pushers and driving dogs has in the past usually been obtained by the employment of suitable control devices for sensing the approach of a leading pusher to the transfer zone and regulating carrier movement so that the carrier is advanced in timed relation to the arrival of a leading pusher so as to place the leading driving dog of a carrier in engagement therewith.

Proper relative positioning between the drive dogs of a carrier and the pushers of the receiving powerline is obtained automatically in the present invention without reliance upon control devices or upon any synchronized speed relation between the forwarding and receiving power lines. A sorting section, best shown in FIG. 1, is installed in the receiving powerline following the transfer zone. Along this sorting section the load track 16 and receiving power track 31 diverge at a first position marked A in FIG. 1 where a pusher disengages from a driving dog, and converge at a second position marked B in FIG. 1 where a pusher and driving dog are again in relation for re-engagement. In the construction shown, the power track 31 follows a laterally off-set serpentine path 40 between positions A and B; however this path and direction of off-set are representative only.

Certain relationships are employed with respect to the length of the load and power tracks through the sorting section between positions A and B as follows:

(1) the length of the load track 16 between positions

A and B does not exceed the spacing between the leading and trailing driving dogs 28 and 30 of a carrier; and (2) the length of the power track along the serpentine path 40 between positions A and B is not less (and preferably slightly greater) than the spacing between the leading pusher 36 and trailing pusher 38 of a pair of pushers of the receiving powerline.

If the foregoing relationships exist, and assuming an unsynchronized relation between the forwarding and receiving powerlines 18 and 26, passage of a carrier through the sorting section may take place in one of the following ways, at random:

(a) The leading dog 28 of the carrier is initially engaged at the transfer zone by the leading pusher 36 of the receiving powerline. This condition is illustrated in FIG. 1. When the carrier reaches position A of the sorting section the leading pusher 36 diverges out of engagement with the leading carrier driving dog 28 and the carrier is unpowered until the trailing pusher 38 of a pair of pushers overtakes the trailing driving dog 30 of the carrier. The carrier is then advanced by engagement between the trailing pusher 38 and trailing driving dog 30 until the latter reaches position A and the trailing pusher 38 disengages from the trailing driving dog 30. At this time the leading carrier driving dog 28 will be advanced at least to position B because the length of the load track between positions A and B does not exceed the spacing between the leading and trailing driving dogs 28 and 30. When the leading driving dog 28 reaches position B the leading pusher 36 will be approaching position B as illustrated in FIG. 3 because of the greater length of the power track along the path 40. Consequently the leading driving dog 28 of the carrier is re-engaged by the leading pusher 36 at position B and the carrier moves almost continuously along the receiving powerline.

In other words, the distance travelled by a pusher between positions A and B is greater than the distance travelled by a carrier dog between said positions by an amount in excess of the difference in spacing between the leading and trailing pushers of a pair and between the leading and trailing dogs of a carrier.

(b) The leading dog 28 of a carrier is initially engaged by the trailing pusher 38 of a pair of pushers as illustrated in FIG. 4. The carrier is advanced to position A of the sorting section where the trailing pusher 38 disengages from the carrier dog 28 and the carrier is unpowered. The carrier remains unpowered until its trailing dog 30 is engaged by the trailing pusher 38a of the next following pair of pushers 36a, 38a and is advanced by pusher 38a through the sorting section. The leading dog 28 of the carrier is then engaged by pusher 36a at position B.

(c) The trailing dog 30 of a carrier is initially engaged by the leading pusher 36 of a pair of pushers. In this case, the carrier is advanced through the sorting section to the position shown in FIG. 5 where the leading pusher 36 engaging the trailing dog 30 disengages therefrom, proceeds around the serpentine path 40 and engages with the leading dog 28.

(d) The trailing dog 30 of the carrier is initially engaged by the trailing pusher 38 of a pair of pushers. The carrier is advanced through the sorting section by engagement between its trailing dog 30 and the trailing pusher 38 to the position shown in FIG. 3. The trailing pusher 38 disengages from the trailing dog 30 at position A and the leading dog 28 of the carrier is almost immediately engaged by the leading pusher 36 which has fallen in behind it due to the greater length of the serpentine path 40 travelled by the leading dog in passing through the sorting section.

It will thus be seen that regardless of which pusher of a pair engages which dog of a pair on a carrier initially, the dogs and pushers are automatically reoriented as the carrier passes through the sorting section to place the leading dog 28 of the carrier in proper engagement with the leading pusher 36 of a pair of pushers.

Another useful application of the invention which has been developed at this time is that of propelling a carrier practically continuously through a detour in the powerline. Such a detour is illustrated by the serpentine path of travel 40 described above and might be desirable in order to provide clearance for the support or installation of other apparatus on the load track. Operation of the carrier through such a detour section would ordinarily be the same as described in A above.

While preferred embodiments have been described above in detail, it will be understood that numerous modifications might be resorted to without departing from the scope of the invention as defined in the following claims.

I claim:

1. A power and free conveyor having a load track supporting a carrier equipped with a pair of longitudinally spaced leading and trailing driving dogs, a receiving power track supporting an endless propelling member having pairs of longitudinally spaced leading and trailing pushers mounted thereon with the spacing between each pair of pushers being slightly in excess of the spacing between said driving dogs and with a different spacing between adjacent pairs of leading and trailing pushers and a transfer zone at which the load and receiving power tracks converge to position the pushers of the receiving power track in driving relation with the dogs of a carrier characterized by the provision of a dog and pusher sorting section following the transfer zone for automatically placing the leading pusher of a pair of pushers in engagement with the leading dog of a carrier, said sorting section comprising a track section along which the load and receiving power tracks diverge and converge from a first position where a pusher and driving dog disengage to a second position where they can re-engage, the length of the load track between said first and second positions not exceeding the spacing between the leading and trailing driving dogs of a carrier, the length of the receiving power track between said first and second positions being not less than the spacing bewteen the leading and trailing pushers of the receiving powerline.

2. In a power and free conveyor having a load track supporting a carrier, a power track supporting an endless propelling member with pushers thereon projecting toward the load track and the carrier having longitudinally spaced leading and trailing driving dogs projecting toward the power track for engagement by a pusher, the combination of the propelling member having adjacent pairs of pushers spaced apart a distance in excess of the distance between the leading and trailing driving dogs of the carrier, a track section where the power track and load track diverge and then converge to provide a length of the power track which exceeds the length of the load track through said section, wherein the length of the load track through said section does not exceed the spacing between the leading and trailing driving dogs of the carrier and wherein the length of the power track through said section is not less than the distance between said pair of pushers.

3. In a power and free conveyor having a load track supporting a carrier, a power track supporting an endless propelling member with pushers thereon projecting toward the load track and the carrier having longitudinally spaced leading and trailing driving dogs projecting toward the power track for engagement by a pusher, the combination of the propelling member having adjacent pairs of pushers spaced apart a distance in excess of the distance between the leading and trailing driving dogs of the carrier, a track section where the power track and load track diverge and then converge to provide a length of the power track which exceeds the length of the load track through said section, wherein the distance travelled by a pusher through said section is greater than the distance travelled by a carrier through said section by an amount which exceeds the difference between the spacing of a pair of pushers and the spacing of the leading and trailing dogs of the carrier.

4. A power and free conveyor having a track supporting a carrier equipped with a pair of longitudinally spaced leading and trailing driving dogs, an adjacent track supporting an endless propelling member having pairs of longitudinally spaced leading and trailing pushers mounted thereon with the spacing between each pair of pushers being slightly in excess of the spacing between said driving dogs, characterized by the provision of a driving dog and pusher sorting section for automatically placing the leading pusher of a pair of pushers in engagement with the leading dog of a carrier, said sorting section comprising a track section along which the carrier and propelling member supporting tracks diverge and converge from a first position where a pusher and driving dog disengage to a second position where they can re-engage to provide a length of the propelling member supporting track which exceeds the length of the carrier supporting track between said positions, the length of the carrier supporting track between said first and second positions not exceeding the spacing between the leading and trailing driving dogs of a carrier, the length of the propelling member supporting track between said first and second positions being not less than the spacing between the leading and trailing pushers of a pair of pushers.

No references cited.

ARTHUR L. LA POINT, *Primary Examiner.*